United States Patent [19]

Dodgen

[11] Patent Number: 5,431,093
[45] Date of Patent: Jul. 11, 1995

[54] BARBECUE DEVICE

[75] Inventor: John N. Dodgen, Humboldt, Iowa

[73] Assignee: Dodgen Industries, Inc., Humboldt, Iowa

[21] Appl. No.: 228,497

[22] Filed: Apr. 15, 1994

[51] Int. Cl.⁶ .................. A47J 37/04; A47J 37/07; F24B 3/00

[52] U.S. Cl. .................. 99/427; 99/421 H; 99/446; 99/448; 126/25 R

[58] Field of Search ............. 99/339, 340, 419, 421 R, 99/421 H, 421 HH, 421 HV, 421 V, 444–446, 450, 482, 389; 126/25 R, 9 R, 9 B

[56] References Cited

U.S. PATENT DOCUMENTS

| D. 329,623 | 9/1992 | Dodgen . | |
|---|---|---|---|
| 2,335,217 | 11/1943 | Tate | 99/444 |
| 2,734,499 | 2/1956 | Lombardi | 99/446 |
| 2,885,950 | 5/1959 | Stoll et al. | 99/446 |
| 3,154,005 | 10/1964 | Roecks et al. | 99/389 |
| 3,247,827 | 4/1966 | Cremer | 126/25 R |
| 3,324,788 | 6/1967 | La France | 99/389 |
| 3,543,672 | 12/1970 | Payonk | 99/340 |
| 3,742,838 | 7/1973 | Luschen et al. | 99/421 H |
| 3,832,989 | 9/1974 | Belford | 126/25 R |
| 4,072,092 | 2/1978 | Kohli et al. | 99/389 |
| 4,089,258 | 5/1978 | Berger | 99/339 |
| 5,097,817 | 3/1992 | Dodgen . | |
| 5,129,385 | 7/1992 | Dodgen . | |
| 5,158,066 | 10/1992 | Dodgen . | |

Primary Examiner—Timothy F. Simone
Attorney, Agent, or Firm—Zarley, McKee, Thomte, Voorhees, & Sease

[57] ABSTRACT

A barbecue device includes an oven container having a top, bottom, opposite sides, opposite ends, and a centrally disposed cooking zone wherein foods are suspended. One or more bins for holding combustible materials are mounted on sides and yet laterally removed from underneath the cooking zone so as to prevent liquids from dripping off of the suspended foods and falling upon the combustible materials. The bins are easily accessible when rigidly and obliquely mounted to extend inside the oven container through an aperture in the side. The portions of the bins facing inward are permeable to smoke and heat while the outwardly facing portions are not. The oblique angle of the bins allow the combustible materials therein to provide an even source of heat to the food, particularly when the food is suspending in rotating rotisserie baskets. A hinged lid and handle facilitate the loading and unloading of the bins. The barbecue device disclosed herein is adaptable to many types of barbecue ovens including, but not limited to, those having rotisseries, stationary grill racks, or an interchangeable combination thereof.

20 Claims, 3 Drawing Sheets

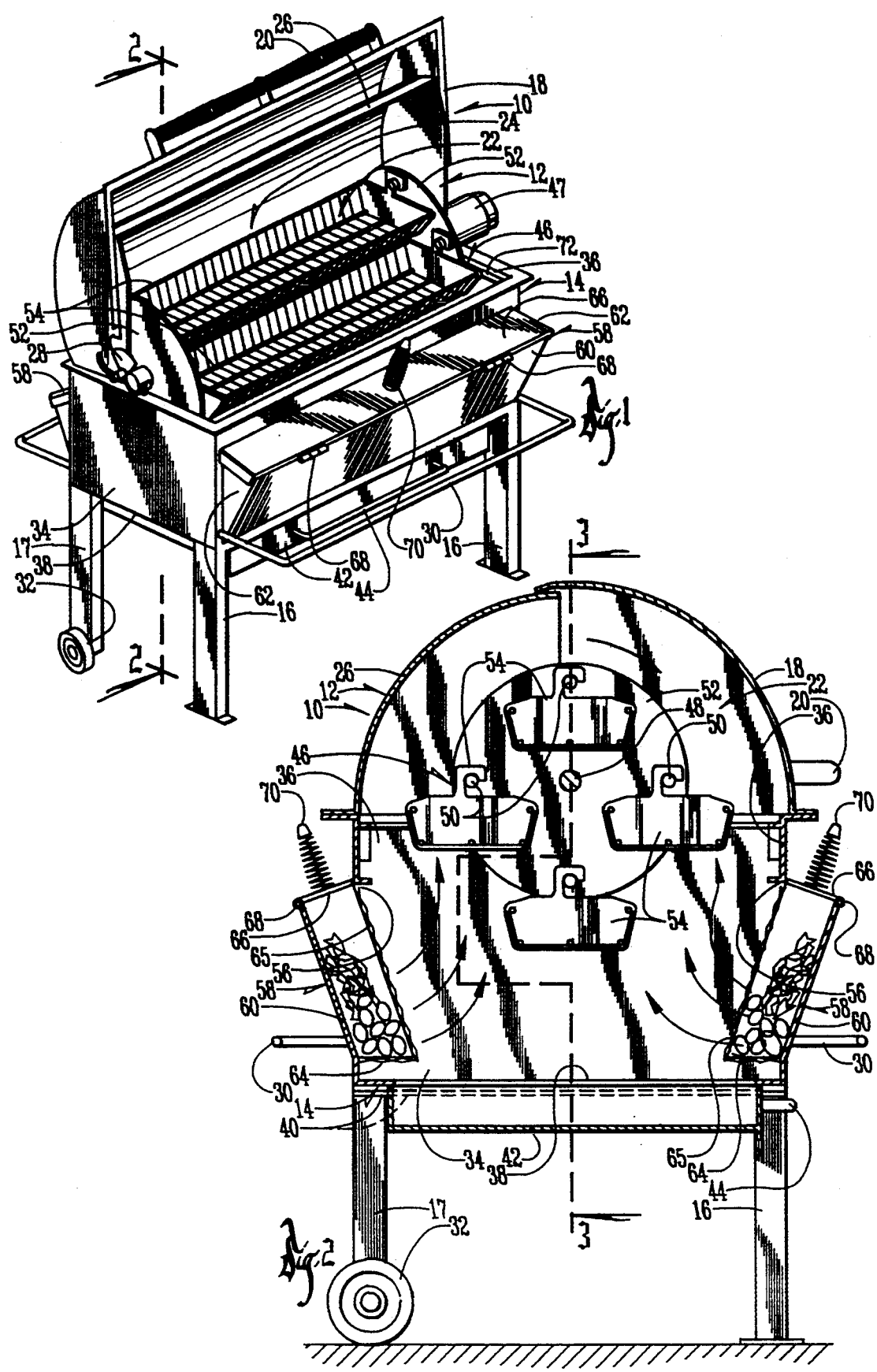

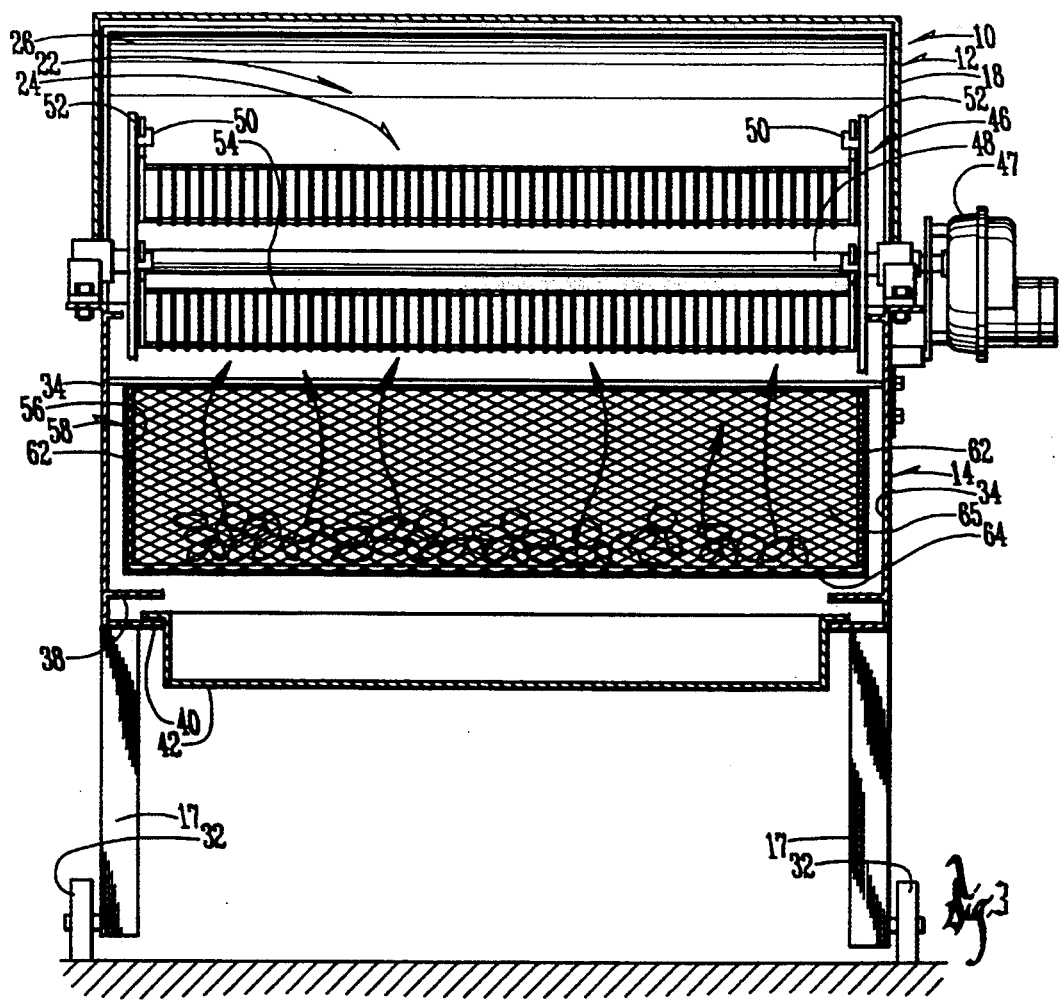
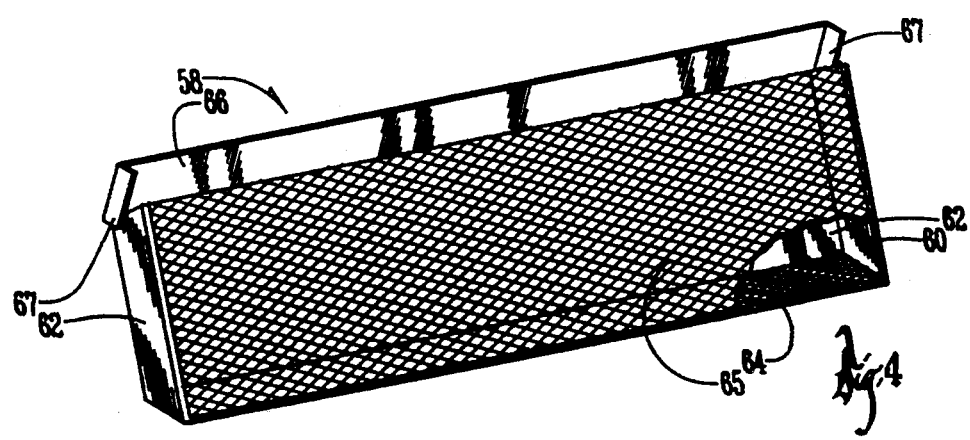

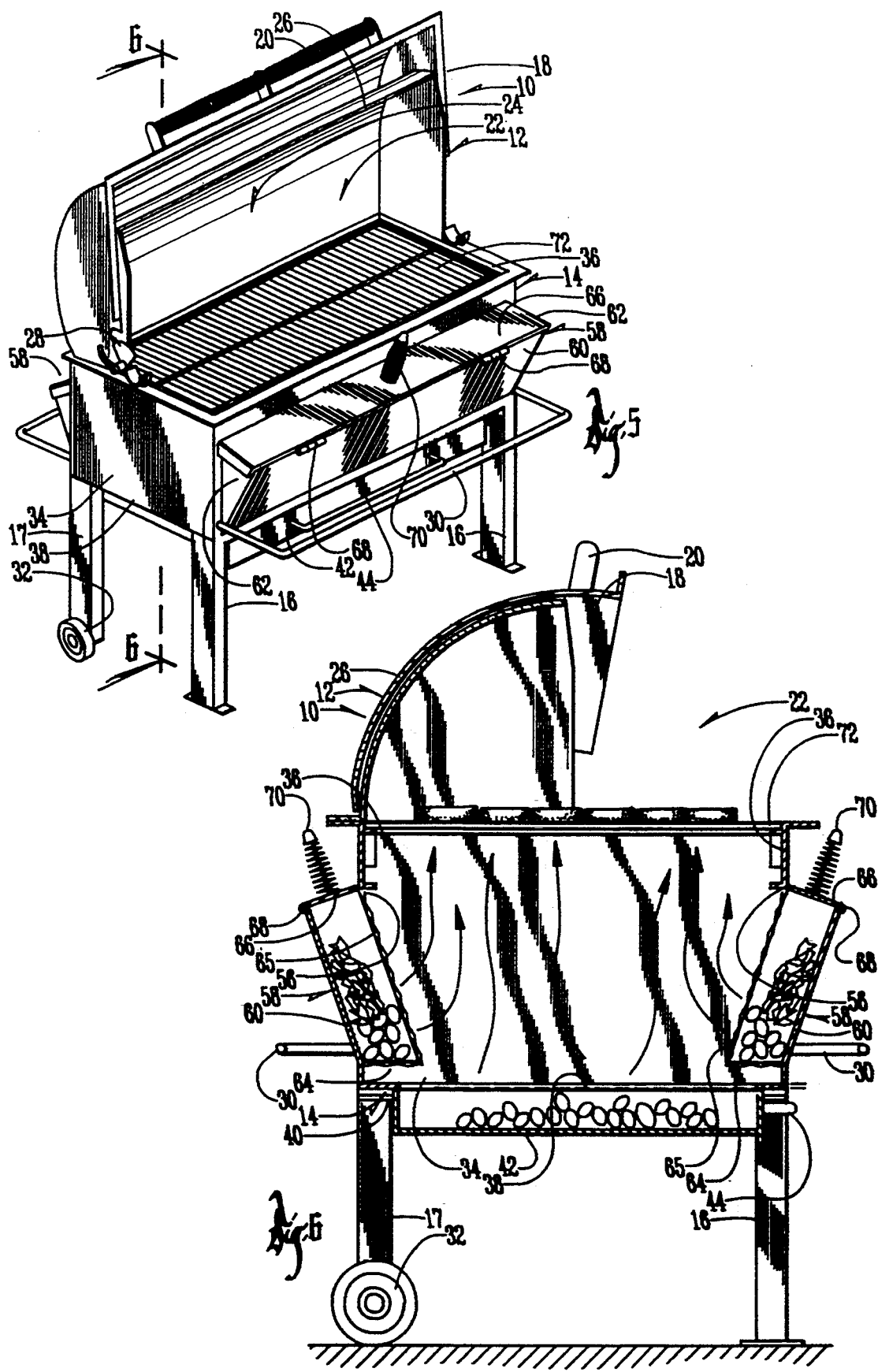

BARBECUE DEVICE

BACKGROUND OF THE INVENTION

The present invention relates to the field of barbecue devices for cooking food. In particular, this invention relates to barbecues devices wherein foods are cooked above a source of heat and smoked for added flavor.

One of the difficulties with existing barbecue units is that grease escaping from the heated food normally falls directly down into the heating system, which is usually located in a tray at the bottom of the unit, causing flare-ups and unwanted fire and smoke. This is particularly true when wood chips or other means are placed on top of the heating system to provide smoke for flavoring the barbecued foods. When covered with grease, wood chips or other smoke generating materials tend to ignite and burst into flame, become wet, or otherwise lose their effectiveness in providing smoke for flavoring. The best flavor is obtained from wood smoke, not burnt grease.

It is therefore a principle object of the present invention to provide a barbecue device wherein the smoke and heat generating materials are held in laterally disposed bins located generally above and to the side of the bottom tray and generally below the cooking zone, but not directly in line vertically with either of the above-mentioned structures.

A further object of this invention is to provide bins which are obliquely mounted on the side walls of the barbecue device for holding smoke and heat generating materials to permit easy filling and access thereto.

A further object of this invention is to provide a rotisserie-type barbecue device which subjects the smoke generating materials to heat from the heat generating materials without subjecting either of said materials to grease dripping from the barbecued foods.

A further object of this invention is to provide bins for holding smoke and heat generating materials laterally remote from the cooking zone of a barbecue device such that a rotisserie and a stationary grill rack are interchangeably mountable in the barbecue device.

A further object of this invention is to provide a barbecue device in which the bins for holding smoke and heat generating materials are located laterally remote from the cooking zone.

A further object of this invention is to provide bins for holding smoke generating materials which are located so as to prevent such materials from being dripped upon by grease from the food cooking above.

These and other objects will be apparent to those skilled in the art.

SUMMARY OF THE INVENTION

The present invention is a barbecue device which includes an oven container having a top, bottom, opposite sides, opposite ends, and a centrally disposed cooking zone wherein foods are suspended above a source of heat located at each side of the oven. Bins for holding smoke and heat generating materials are mounted laterally removed from underneath the cooking zone so as to prevent liquids from dripping off of the suspended foods and falling upon the smoke and heat generating materials. The bins are easily accessible when rigidly and obliquely mounted to extend inside the oven container through an aperture in the side. The portions of the bins facing inward are permeable to smoke while the outwardly facing portions are not. The bins are mounted on an angle which allows the materials therein to provide an even source of heat. A hinged lid and handle facilitate the loading and unloading of the bins. The end portions of the lid extend downwardly to overlap the ends of the bin and help contain any smoke and heat therein. The barbecue device disclosed herein is adaptable to many types of barbecue ovens including, but not limited to, those having rotisseries, stationary grill racks, and interchangeable rotisseries and stationary grill racks.

BRIEF DESCRIPTION OF THE DRAWINGS

FIG. 1 is a perspective view of an embodiment of this invention which includes a rotisserie.

FIG. 2 is an enlarged scale sectional view taken along line 2—2 of FIG. 1.

FIG. 3 is a sectional view taken along line 3—3 of FIG. 2.

FIG. 4 is a perspective view of one of the bins of this invention as viewed from the interior of the oven container.

FIG. 5 is a perspective view showing an embodiment of the present invention which includes a horizontally mounted stationary grill rack, which is interchangeable with the rotisserie of FIG. 1, on which food is placed for cooking.

FIG. 6 is a sectional view taken along line 6—6 of FIG. 5.

DETAILED DESCRIPTION OF THE PREFERRED EMBODIMENT

It will be appreciated that the invention can take many forms and embodiments. The true essence and spirit of this invention are defined in the appended claims, and it is not intended that the embodiments of the invention presented herein should limit the scope thereof.

Referring to FIG. 1, a barbecue oven 10 has an oven container 12 having a bottom rectangular portion 14 with front legs 16 and rear legs 17 and a lid portion 18. Handle 20 is secured to lid portion 18 to facilitate the opening and closing thereof. Oven container 12 has a cooking zone 22, and the numeral 24 designates a geographical center of the cooking zone. A hood 26 is secured to the bottom rectangular portion 14 and has a shape complimentary to that of the arcuate lid portion 18. Lid portion 18 is pivotally secured to the oven container by hinges 28. A handle/guard rail 30 is attached to the front and rear of rectangular portion 14 for keeping the operator from contacting the hot portions of oven 10. The handle/guard rail 30 attached to the front portion 14 is also useful for tipping the barbecue oven 10, so as to make the same transportable on wheels 32 which are rotatably mounted to rear legs 17.

As best seen in FIG. 3, the bottom rectangular portion 14 has ends 34, sides 36, and a bottom 38 having an inwardly facing peripheral lip 40 attached thereto on which a tray 42 is slidably mounted for catching any grease or drippings from the food above and optionally (see FIG. 6) holding heat generating materials. Charcoal briquettes are the form of heat generating materials shown in the figures, however, other suitable means of generating heat may be utilized, such as wood chunks, propane, natural gas, or electric coils. It should be understood that wood is particularly well-suited for use in barbecue cooking because it is combustible and capable of producing both heat for cooking and smoke for flavoring. For the sake of brevity, combustible materials will be understood hereinafter to refer inclusively to smoke and heat generating materials. A handle 44 is attached to the front of tray 42 for the purpose of allowing the tray to be pulled from under the rectangular portion 14. Spent charcoal or wood ashes can be removed and new wood chunks and/or briquettes inserted when tray 42 is pulled open.

A cooking rotisserie 46 which is the subject of U.S. Pat. No. 5,129,385 as shown in FIGS. 1–3. End plates 52 are rotatably mounted within the oven container 12 on shafts 48. A plurality of horizontally disposed stub shafts 50 extend inwardly from each end plate 52 and support baskets 54 as disclosed in the aforementioned patent.

In FIGS. 1 and 2, bins 58 for holding smoke and heat generating materials are obliquely mounted to sides 36 of oven 10 generally below cooking zone 22 and generally above tray 42. In the preferred embodiment, one bin 58 is mounted by conventional means to side 36 over aperture 56 in the rectangular portion 14 at the front of container 12, and another bin 58 is similarly mounted in the same relative location to side 36 over aperture 56 at the rear of oven container 12. Thus, heat and smoke from both sides evenly heats and smokes the food during the rotation of the rotisserie. Furthermore, each bin 58 preferably angles outwardly from the respective side 36 at the slope. The angle is selected so that heat developed inside of bin 58 is evenly direct toward the support basket 54 of the rotisserie 46.

Although shown as rigidly mounted, it is also contemplated that bins 58 could be removably and/or tiltably mounted by conventional means to sides 36 if adequate space exists in oven container 12 so that the installed bins still hold the combustible materials in positions which are laterally removed from the cooking food.

The top portions of bins 58 extend outwardly from the sides 36 of the oven 10. The lower portions of bins 58 extend inside of the oven container 12, but not far enough to be directly beneath the bottoms of baskets 54. Grease from the food cooking in baskets 54 is, therefore, prevented from dripping on the combustible materials held in bins 58. Because the smoke generating materials are held inside oven container 12, as shown in FIG. 3, those materials are quite effectively heated to provide smoke for flavoring the food without the normal danger of ignition due to a grease flare-up. Of course, when grease flare-up causes the smoke generating materials to ignite or burst into flames, they can no longer provide the controlled smoke desired for slow cooking and flavoring barbecued foods. Such flames can also burn the food and present a potentially serious safety hazard.

As best seen in FIG. 2, the bins 58 mounted on the respective front and rear sides 36 are substantially identical. Therefore, only one bin 58 is shown in FIG. 4 and will be described below. FIG. 4 shows the structure of bins 58 as viewed from inside oven container 12, in greater detail. Bin 58 includes an outer side wall 60, opposite ends 62, bottom 64, and inner wall 65. Preferably, bottom 64 and inner wall 65 are constructed of a steel grate having a diamond-shaped mesh. The mesh size is small enough to prevent smoke generating materials from escaping bin 58 and yet large enough to effectively allow heated air to penetrate the bin and smoke to move toward cooking zone 22. In the preferred embodiment, a mesh having one inch diamond-shaped openings performs well.

As best seen in FIGS. 1 and 2, a lid 66 is pivotally mounted to outer side wall 60 by a pair of hinges 68. A handle 70 is attached to the top of lid 66 and provides a means of opening and closing the lid. The end portions of lid 66 extend downwardly over bin ends 62 to help prevent smoke from escaping out of oven container 12. When lid 66 is open, combustible materials can be loaded in the bin or removed therefrom. Otherwise, lid 66 is normally closed during the operation of barbecue oven 10. The volume of bin 58 is sufficient to hold a small quantity of hickory wood chips, wood chunks, charcoal briquettes or other suitable smoke and heat generating materials.

Preferably, apertures 56 and bins 58 run substantially the entire length of the sides 36 of oven 10 to ensure uniform smoking of the barbecued foods along the entire length of the cooking zone 22. This structural relationship is best seen in FIG. 1. It will now be understood that bins 58 allow combustible materials to be operatively interposed between tray 42 and the food in cooking zone 22. The materials placed in bins 58 thereby generate heat and smoke for flavoring the food in the cooking zone.

In an alternate embodiment, which is shown in FIGS. 5 and 6, a horizontally mounted grill rack 72 is interchanged with rotisserie 46. Grill 72 is stationary and suspends the food for cooking, whereas rotisserie 46 rotates the food about the center 24 of cooking zone 22. In FIG. 6, tray 42 is filled with heat generating materials to assist in evenly cooking the generally stationary food on grill 72 above. In both the grill and rotisserie embodiments, bins 58 are located in laterally remote positions so as to not be directly vertically in line with the cooking food. Furthermore, in the grill embodiment the bins 58 are also located laterally remote from the heat generating combustible materials in tray 42. Since the basic structure of the barbecue oven with the bins remains constant, it should be apparent that a combination unit can be provided with this invention. The combination unit has an interchangeable rotisserie and grill rack. When long slow cooking is desired the rotisserie can be used with the bin arrangement described herein. When cooking for a short duration the grill rack performs well and can utilize the bin arrangement for flavoring the foods with smoke. The bins also provide a more easily rechargeable source of heat.

OPERATION OF THE INVENTION

In the embodiment depicted in FIGS. 1–3, the barbecue device is operated as follows. Combustible materials are placed in each bin 58. The heat generating material is ignited and the oven is brought to the desired cooking temperature. By lifting lids 66 with handles 70, the operator can load additional combustible material, such as hickory wood chips, wood chunks, and/or briquettes for example, into bins 58 as needed during the cooking process. The operator then loads the baskets 54 of the rotisserie 46 with the foods to be barbecued. Poultry, fish, and various cuts of beef, pork, veal or other known meat are sometimes cooked in an oven equipped with a rotisserie. Lids 18 and 66 are then closed in order to contain the heat and smoke inside oven 10. Motor 47 is actuated to rotate rotisserie 46 in the direction shown by the arrow in FIG. 2. The bins 58 which hold the combustible materials are laterally removed from below the path of the rotisserie baskets 54 so that sauce, juices, or grease from the heated food is unlikely to drip or spill on the combustible material.

In the embodiment depicted in FIGS. 5 and 6, the operation is substantially the same as described in the previous paragraph with the exception that heat generating materials are also placed in tray 42 and the food is placed on a stationary grill rack 72 which is horizontally mounted in the cooking zone 22. The food remains stationary and is cooked for some period of time. Sometimes the operator turns the food with a conventional utensil such as a fork or spatula. The other side of the food is then cooked for another period of time and the cook-and-turn process is continued until the desired internal temperature or appearance of the food is reached. Steaks, burgers, pork chops, chicken quarters and the like are generally barbecued on the oven of this embodiment.

Tray 42 is sometimes difficult to remove and reload during the operation of the oven. Bins 58 provide a more convenient means of adding combustible materials when needed.

It should now be apparent that the present invention at least satisfies its stated objectives.

What is claimed is:

1. A barbecue device wherein foods are suspended for cooking, comprising:
    an oven container having a top, bottom, opposite sides, opposite ends, and a centrally disposed cooking zone;
    a rotisserie having an axis of rotation and being detachably mounted in said oven container, said rotisserie including at least one basket having a normally horizontal food supporting surface and being pivotally mounted offset from said axis of rotation; and
    means for holding combustible materials, said means being obliquely mounted on at least one of said sides and vertically located between said cooking zone and said bottom of said oven container yet horizontally spaced outwardly from underneath said cooking zone so as to prevent liquids from dripping off of the suspended cooking foods and falling upon said combustible materials.

2. A barbecue device according to claim 1 wherein said means for holding combustible materials extends inside said oven container.

3. A barbecue device according to claim 1 wherein said means for holding combustible materials comprises at least one bin mounted to cover an aperture in one side of said container, said bin having an outer side wall, opposite ends, and a lid which are impermeable to smoke and a bottom wall and inner wall which are permeable to smoke.

4. A barbecue device according to claim 3 wherein said bottom of said bin is horizontally disposed.

5. A barbecue device according to claim 3 wherein said bin covers said aperture.

6. A barbecue device according to claim 3 further comprising hinge means operatively attached to said lid and said outer side wall for opening and closing said lid of said bin.

7. A barbecue device according to claim 6 wherein said lid includes a handle for moving said lid, thereby facilitating the insertion and removal of combustible materials held in said bin.

8. A barbecue device according to claim 3 wherein said lid includes opposing downwardly extending end portions which overlap said bin ends when said lid is closed to help prevent smoke and heat from escaping from said bin.

9. A barbecue device according to claim 3 wherein said bin is rigidly mounted to at least one of said sides of said container.

10. A barbecue device according to claim 9 wherein two of said bins are rigidly mounted such that one bin is mounted to each of said sides of said container.

11. A barbecue device according to claim 3 wherein said bottom wall and said inner wall of said bin are constructed of an open mesh material.

12. A barbecue device wherein foods are suspended for cooking, comprising:
    an oven container having a top, a bottom, opposite sides, opposite ends, and a centrally disposed cooking zone, at least one of said opposite sides having an aperture therein;
    means for suspending foods in said cooking zone detachably mounted on said oven container;
    means for holding combustible materials extending inside said oven container, said means being obliquely mounted on at least one of said sides and vertically located between said cooking zone and said bottom of said oven container yet horizontally spaced outwardly from underneath said cooking zone so as to prevent liquids from dripping off of the suspended cooking foods and falling upon said combustible materials; and
    said means for holding combustible materials comprises at least one bin mounted to cover said aperture in said side of said container, said bin having an outer side wall, opposite ends, and a lid which are impermeable to smoke and a bottom wall and an inner wall which are permeable to smoke.

13. A barbecue device according to claim 12 wherein said bottom of said bin is horizontally disposed.

14. A barbecue device according to claim 12 wherein said bin covers said aperture.

15. A barbecue device according to claim 12 further comprising hinge means operatively attached to said lid and said outer side wall for opening and closing said lid of said bin.

16. A barbecue device according to claim 15 wherein said lid includes a handle for moving said lid, thereby facilitation the insertion and removal of combustible materials held in said bin.

17. A barbecue device according to claim 12 wherein said lid includes opposing downwardly extending end portions which overlap said bin ends when said lid is closed to help prevent smoke and heat from escaping from said bin.

18. A barbecue device according to claim 12 wherein said bin is rigidly mounted to at least one of said sides of said container.

19. A barbecue device according to claim 18 wherein two of said bins are rigidly mounted such that one bin is mounted to each of said sides of said container.

20. A barbecue device according to claim 12 wherein said bottom wall and said inner wall of said bin are constructed of an open mesh material.

* * * * *